Patented Aug. 26, 1924.

1,506,633

UNITED STATES PATENT OFFICE.

MAX GRUNBAUM, OF NEW YORK, N. Y.

METHOD OF MAKING LEAD PEROXIDE.

No Drawing.  Application filed June 26, 1923. Serial No. 647,914.

*To all whom it may concern:*

Be it known that I, MAX GRUNBAUM, a citizen of the United States, residing at New York, in the county of New York and State of New York, have invented certain new and useful Improvements in Methods of Making Lead Peroxide, of which the following is a specification.

This invention relates to methods of making lead peroxide, and more particularly to methods of making lead peroxide from lead sulfate.

An object of the invention is the formation of lead peroxide from the by-product lead sulfate from various factory processes, which material is now practically valueless.

A further object of the invention is to increase the purity of lead peroxide by removing organic matter ordinarily present in the by-product lead sulfate.

The wet impure lead sulfate is first dried and roasted to burn away the organic matter ordinarily present in by-product lead sulfate. After the drying operation, the material is ground, preferably to 80 mesh. The ground lead sulfate is then added to a caustic alkali solution contained in a tank. The tank is preferably equipped with stirring means to completely mix the ground material and the solution. Chlorine is then run into the suspension in a rapid stream. This heats the solution to boiling point and causes a change in color to light brown and then to dark brown. The contents of the tank are then kept at the boiling point for about 1 hour. The lead peroxide formed is then separated from the solution by decanting or filtering, and when free from soluble alkali, it is ready for most commercial uses, generally as a lead peroxide paste. The quality of the peroxide may be improved by stirring the paste at ordinary temperature with a small amount of nitric acid, about 1 per cent of acid to the weight of the peroxide. The paste is then separated from the acid by decanting or filtering. If desired, the paste can be dried and shipped in dry form.

In a typical embodiment of the invention, by-product lead sulfate from any source and particularly, by-product lead sulfate which has been made from lead peroxide in the manufacture of dye-stuffs, is employed. Commercially pure lead sulfate may also be employed if desired. The lead sulfate is dried and roasted in any desired manner at a temperature of about 500° C. with free access with air. An ordinary rotary kiln may be employed in this step of the process. The roasted product is then ground and may be readily ground in practically any type of mill. The material is then screened to remove particles too large to pass through an 80 mesh screen.

The dried ground material is then added to the alkali solution in a tank and an ordinary steel tank equipped with necessary valves, piping and stirrer may be employed. The stirring may be performed by mechanical means or by means of compressed air. The strength of the alkali solution is preferably that corresponding to specific gravity for a caustic soda solution of 1.3 (about 30% strength by weight) at room temperature. The amount of alkali employed is substantially ½ pound of caustic soda for each pound of lead sulfate used. Instead of a solution of caustic soda, an impure but partially concentrated caustic soda solution obtained in the Solvay or in the electrolytic process where common salt or sodium carbonate are present as impurities may be used. Either pure chlorine or chlorine diluted with an inert gas, such as is often obtained commercially, the "blow off" chlorine of an electrolytic alkali plant, may be employed. To obtain the best results, it is desirable to have the suspension hot during the time that the chlorine is being run in. However, the heat evolved in the reaction of the chlorine with a caustic alkali is sufficient to give the desired heat (above 80° C.). Instead of running in chlorine gas, sodium hypochlorite solution may be used. In place of part of the caustic alkali an alkaline hypochlorite solution may be employed to which the lead sulfate is added and then heated.

Instead of using a solution of sodium hydroxide, the lead sulfate may be heated with solid sodium hydroxide to a fusing temperature, water added thereto, and the material then treated with chlorine or sodium hypochlorite.

The chemistry of the process is apparently as follows:

The lead sulfate dissolves in small part in the strong caustic soda to give sodium sulfate and sodium plumbite ($Na_2PbO_2$) and this is changed by the oxygen furnished by the chlorine and alkali added in the presence of water to lead peroxide and caustic soda. The reaction is progressive, only a portion of the lead sulfate reacting at a time, and the caustic soda reacting with successive portions of lead sulfate.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

Having thus described my invention, I claim:

1. The herein described method of making lead peroxide which comprises heating lead sulfate in a solution of a caustic alkali, and simultaneously admitting chlorine gas to the solution.

2. The herein described process of making lead peroxide which comprises heating finely ground lead sulfate, from which any organic matter originally present has been burned out, in a solution of caustic alkali, and simultaneously admitting chlorine gas to the solution.

3. The herein described process of making lead peroxide which comprises heating lead sulfate in a solution of caustic alkali of about 30 per cent strength by weight, and simultaneously admitting chlorine gas to the solution.

4. The herein described process of making lead peroxide which comprises forming a suspension of lead sulfate in a solution of caustic alkali of about 30 per cent strength by weight, heating and stirring the solution, and simultaneously admitting chlorine gas to the solution.

5. The herein described process of making lead peroxide which comprises forming a suspension of lead sulfate in a solution of caustic alkali of about 30 per cent strength by weight, heating the solution to a temperature above 80° C., stirring the solution during the heating operation, and simultaneously admitting chlorine gas.

In testimony whereof, I affix my signature in presence of two witnesses.

MAX GRUNBAUM.

Witnesses:
RALPH H. McKEE,
CARROLL M. SALLS.